UNITED STATES PATENT OFFICE.

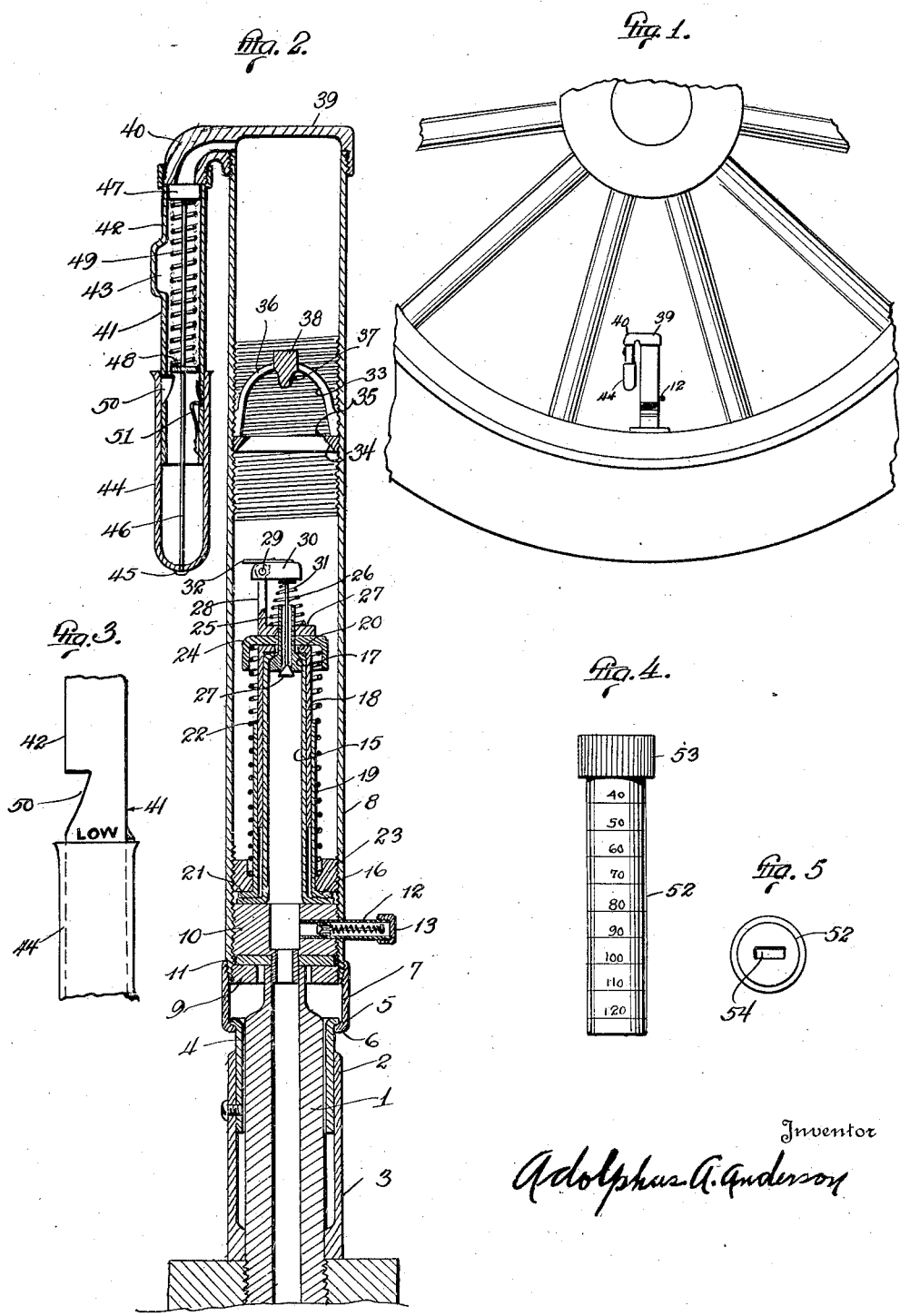

ADOLPHUS A. ANDERSON, OF HAGERMAN, TEXAS.

TIRE-PRESSURE METER.

1,427,146.  Specification of Letters Patent.  Patented Aug. 29, 1922.

Application filed January 6, 1922. Serial No. 527,373.

*To all whom it may concern:*

Be it known that I, ADOLPHUS A. ANDERSON, a citizen of the United States, residing at Hagerman, in the county of Grayson and State of Texas, have invented certain new and useful Improvements in a Tire-Pressure Meter, of which the following is a specification.

This invention relates to automatic pressure meters and more particularly to a pressure meter attachment for pneumatic tires whereby variations in the pressure of air in the tire may be made known.

One of the objects of the invention is to provide an apparatus of this character which will automatically sound a signal whistle when the pressure in the tires becomes low enough to be detrimental thereto.

Another object of the invention is to provide a meter of this character which will automatically operate to release excessive air pressure in the tire caused by inflating the tire too much, or by expansion of the air in the tire caused by rising temperature which is due sometimes to the extreme weather conditions and at other times to the friction between the tire and roadway when running at high speed.

Other objects of the invention will appear upon consideration of the following detail description and accompanying drawing wherein:—

Figure 1 is a fragmentary view of a portion of a wheel and tire showing my invention applied thereto, Figure 2 is an enlarged longitudinal section through the device constructed in accordance with my invention, Figure 3 is a fragmentary elevation of a portion of the whistle structure, Figure 4 is an elevation of the adjusting tools for the meter, and Figure 5 is an end view of the same.

The device is adapted to be attached to the inner tube valve stem 1, which of course slightly varies in size on different types of tubes. An adjustable connecting tube 2 is adapted to be mounted upon the stem 1 and consists of the longitudinally adjustable sections 3 and 4 connected together by a screw member whereby the sections 3 and 4 may be longitudinally adjusted to fit different sizes of inner tube valve stems. The upper end of the section 4 is provided with an outwardly flared annular flange 5 which engages the inwardly turned annular flange 6 of a main tube connecting nut 7 which is provided with interior screw threads to receive the lower end of the main tube 8. The main tube 8 is long enough to receive the mechanism included in the meter structure as shown. The lower end of the main tube 8 is provided with an end nut 9 having a central opening through which the upper end of the stem 1 extends and an inflating valve ring 10 is also located in this end of the tube and rests against a gasket 11 which is interposed between the nut 9 and the ring 10. The ring 10 is provided with a transverse opening to receive the inflating valve 12 which projects radially through an opening in the side of the main tube 8. This inflating valve 12 is provided with a removable cap 13 so that an air hose may be attached to force air into the tube. This inflating valve is provided with the usual valve member 14 of conventional form.

A flexible expanding tube 15 of rubber or other suitable material is arranged within the main tube and is provided at its lower end with an annular flange 16 which rests against the ring 10 and has its upper end provided with an inturned flange 17. This flexible tube 15 is embraced by the telescoping sections 18 and 19 of the adjusting tube which embraces the flexible expanding tube 15 as shown. The upper end of the section 18 is provided with an inturned annular flange 20 which engages the annular flange 17 on the flexible tube 15 and the lower end of the section 19 is provided with an annular flange 21 which engages the annular flange 16 of the lower end of the flexible tube. Surrounding the expanding or telescoping sections 18 and 19 is a main expansion spring 22, the lower end of which is mounted in an annular recess provided in the nut 23 while the upper end is engaged by the main spring cap 24 mounted upon the annular flange 20 as shown. The cap 24 is provided with an opening to receive the valve body 25 which is equipped with a longitudinally movable valve stem 26 carrying a valve 27 opening into the interior of the flexible tube 15. Mounted upon the top of the cap 24 is the base 27′ of a bracket member 28 which is provided with a pivot 29 to receive the rocker arm 30 which engages the upper end of the valve stem 26 when the valve 27 is in closed position. This valve is normally held in closed position by a valve spring 31 interposed between the base 27' and an abutment member on the upper end of the valve stem 26. Attached to the rocker arm 30 is a trip spring 32 which projects from the rocker arm as shown in Fig. 2 of the drawing.

Arranged in the tube above the mechanism just described is an adjusting nut 33 which includes an annular screw threaded ring 34 adapted to be longitudinally adjusted in the tube 8. This ring is beveled as shown to provide an annular lip 35 which engages the spring 32 during the operation of the mechanism. The nut also includes the upwardly extending and inwardly curved arms 36 which carry a centrally located trip pin 37 adapted to engage the rocker arm 30 when excessive pressure occurs. A square portion 38 above the pin 37 is adapted to be engaged by an adjusting tool shown in Figs. 4 and 5 of the drawing and which will be hereinafter described.

Mounted upon the top of the tube is a removable tube cap 39 which is provided with a hollow projection 40 to carry the whistle structure 41.

Attached to the portion 40 is the whistle piston chamber 42 having an offset portion to form a recess 43. Slidably mounted over the open end of the whistle piston chamber 42 is a telescoping whistle cap 44 having a closed end connected as indicated at 45 to a piston rod 46 which carries at its upper end the piston 47 adapted to longitudinally move in the chamber 42. An abutment ring 48 has a central opening through which the stem 46 passes and this abutment member engages a coil spring 49 which presses against the piston 48 and normally urges the piston into closed position for closing the passageway in the projection 40. A V-shaped notch or opening 50 in the lower end of the chamber 42 forms the whistle and the outside of the chamber 42, at a point below the opening 50 is inscribed with the word "Low" so that when the cap 44 moves downwardly to open the whistle opening 50 the word "Low" will be exposed to view. A spring catch 51 is provided to engage the cap to hold it in open position until after the cap has been manually released.

The adjusting tool shown in Figs. 4 and 5 consists of a cylindrical body 52 having a knurled head 53 at one end and provided throughout its length with suitable graduations inscribed with figures indicating various air pressures. The opposite end of the body 52 is closed and provided with a substantially square opening 54 to receive the square portion 38 of the adjusting nut 33 within the tube. When the cap 39 is removed from the tube, the tool 52 may be inserted in the open end of the tube and engaged with the square portion 38 of the adjusting nut so that the nut may be turned to properly adjust it with respect to the rocker arm 30 and spring 32 thus setting the meter for the desired pressure.

When excessive pressure occurs within the tube of the pneumatic tire, the flexible tube 15 and the telescoping sections 18 and 19 will be longitudinally expanded until the rocker arm 30 moves into engagement with the trip pin 37 thus depressing the valve stem 26 and opening the valve 27 to permit the escape of air. The whistle will not sound unless the air pressure becomes suddenly excessive. Ordinarily the pressure will increase so gradually that the air will escape without sounding the whistle. However, when the pressure becomes too low in the tire the whistle will be readily sounded. At proper pressure the rocker arm will be located in a position within the adjusting nut approximately midway between the lip 35 and the pin 37 so that when the pressure drops the spring 32 will engage the lip 35 and cause the rocker arm to depress the valve stem 26 thus opening the valve 27 and permitting air to escape thus forcing the whistle piston 47 downwardly against the action of the spring 49 until the piston 47 passes the space 43 whereupon the air will readily pass the piston and also pass through a notch in the abutment member 48 to be discharged through the whistle opening 50 thus sounding the whistle and warning the driver that the pressure in the tire has been lowered. If the driver is not within hearing distance of the whistle at the time this occurs he may know of the low pressure by the exposition of the word "Low" on the tube which will be uncovered by the downward movement of the cap 44 which is attached to the piston 47. The catch 51 will hold the cap 44 in this lowered position until after the catch has been released.

Thus it will be seen that the operation of the mechanism for indicating excessive high pressure and low pressure is entirely automatic.

Minor changes may be made in the details of construction without departing from the spirit of the invention or the scope of the claims hereunto appended.

What is claimed is:

1. In an automatic pressure meter of the character described, the combination of the main tube connected to the stem of a pneumatic tire tube, a longitudinally expansible tube within the main tube, a longitudinally adjustable nut in the said main tube equipped with a high pressure trip member and a low pressure trip member, a valve means mounted on the movable end of the said longitudinally expansible tube, means engageable with the said valve member and with the said high pressure trip member and low pressure trip member whereby the said valve may be opened when either of the said trip members are engaged with the said trip means, and a signally element attached to the tube and in communication therewith to be sounded by the air passing from the tube when the said valve in the expansible tube is opened.

2. In an automatic pressure meter of the character described, the combination of a main tube attached to the valve stem of a pneumatic tire tube, a longitudinally expansible flexible tube within the said main tube, a valve mounted on the movable end of the said expansible tube, means to normally hold the valve in closed position, a rocker arm pivotally mounted and engageable with the stem of the said valve, a spring trip member carried by the said rocker arm, an adjustable nut mounted in the tube and adapted to be longitudinally movable for setting the valve to various pressures, a trip pin carried by the adjustable member, and adapted to engage the rocker arm when excessive pressure occurs, and an annular lip adapted to engage the low pressure trip member when a low pressure occurs, either of the said trip members being adapted to operate the rock arm for moving the valve stem to open the said valve, a signal whistle and means mounted in the body of the whistle to be actuated by the air escaping from the tube for sounding the said whistle.

In testimony whereof, I have affixed my signature in the presence of two witnesses.

ADOLPHUS A. ANDERSON.

Witnesses:
M. G. SMITH,
B. H. ANDERSON.